United States Patent [19]

Beguhn

[11] 4,236,652

[45] Dec. 2, 1980

[54] DISPENSER PACKAGE

[75] Inventor: Gordon H. Beguhn, Westport, Conn.

[73] Assignee: American Can Company, Greenwich, Conn.

[21] Appl. No.: 22,113

[22] Filed: Mar. 20, 1979

[51] Int. Cl.³ .............................................. B65D 35/00
[52] U.S. Cl. ..................................... 222/92; 222/541; 206/484; 206/634
[58] Field of Search .......................... 222/92, 107, 541; 206/484, 634; 401/132

[56] References Cited

U.S. PATENT DOCUMENTS

| | | | |
|---|---|---|---|
| 2,705,579 | 4/1955 | Mason | 222/107 |
| 3,263,863 | 8/1966 | Hoag | 222/107 |
| 3,521,805 | 7/1970 | Ward | 222/107 X |
| 3,635,376 | 1/1972 | Hellstrom | 222/107 |
| 3,741,384 | 6/1973 | Cloud | 222/107 X |
| 3,986,640 | 10/1976 | Redmond | 222/92 |
| 4,084,910 | 4/1978 | LaRosa | 222/92 X |

*Primary Examiner*—Joseph J. Rolla
*Attorney, Agent, or Firm*—Robert P. Auber; George P. Ziehmer; Ernestine C. Bartlett

[57] ABSTRACT

An improved package for dispensing a flowable product is provided. The package has enhanced moisture resistance and is readily opened with one hand. The improvement resides in the use of an imperforate, uniaxially oriented polymeric film as a protective barrier layer over the scored outer layer of a package which comprises a scored rigid sheet member secured to a flexible sheet member forming a pocket for containment of a flowable product. The oriented film is attached over the scored rigid member to protect the contents of the package. The film ruptures when the score ruptures upon bending the scored rigid member toward the pocket to open the package.

14 Claims, 5 Drawing Figures

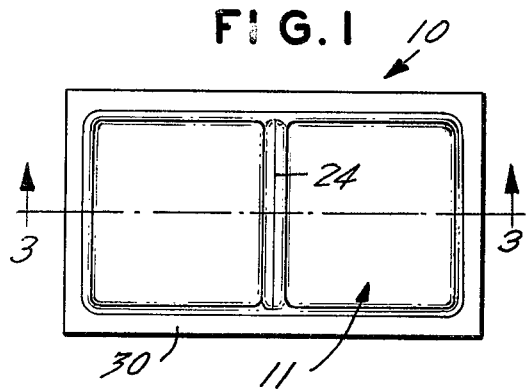
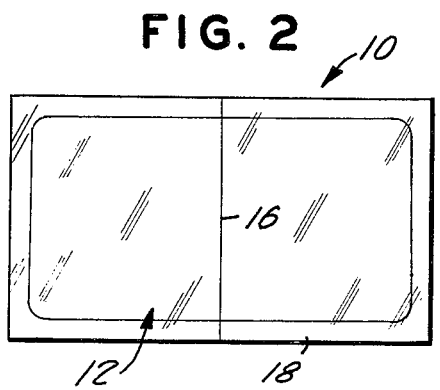
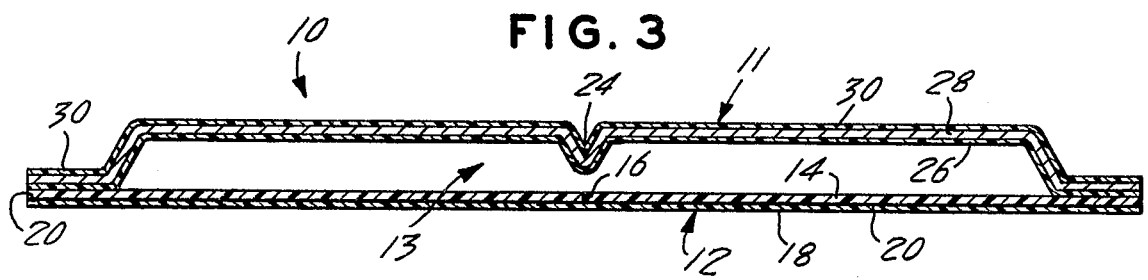
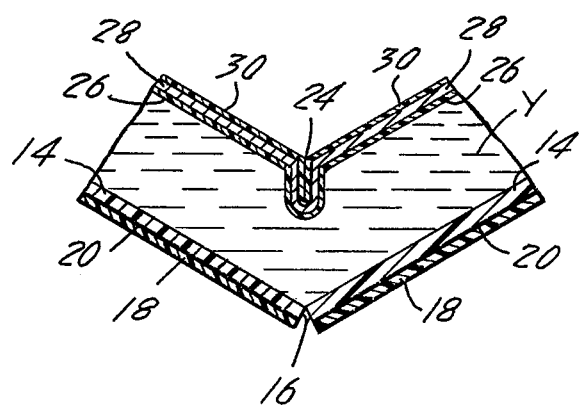
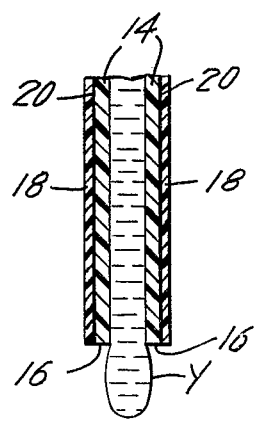

DISPENSER PACKAGE

BACKGROUND OF THE INVENTION

The prior art appears to be best exemplified by the following U.S. Pat. Nos.:

| Redmond  | 3,986,640 | 10/76 |
|----------|-----------|-------|
| Lowry    | 3,315,801 | 4/67  |
| Lowry    | 3,355,854 | 12/67 |
| Hellstrom| 3,472,368 | 10/69 |
| Hellstrom| 3,472,367 | 10/69 |
| Marks    | 3,759,371 | 9/73  |
| Hoag     | 2,499,313 | 2/50  |
| Hoag     | 3,263,863 | 8/66  |
| Becker   | 3,223,310 | 12/65 |
| Sparks   | 3,207,299 | 9/65  |
| Hellstrom| 3,689,458 | 9/72  |

This invention relates to improvements in packages for dispensing flowable products, e.g. cream, jelly, shampoo, talc, etc. in a desired quantity.

Various proposals exist in the art for the packaging of flowable products in the quantity in which such product will be normally used. A ready illustration is the now familiar package made from sheets of relatively thin plastic, sometimes laminated with other plastics or with foil, commonly used to dispense ketchup, mustard, etc. In order to open such a package, the sheets must be ripped through the sealed edge and across the envelope in which the flowable material is contained. It commonly happens that the package is difficult to open or rips uncontrollably squeezing product out during opening.

In U.S. Pat. No. 3,986,640 to Redmond, there is described a package which is formed by superimposing a sheet of relatively flexible material over a sheet of relatively stiff but flexible material with the product to be packaged between the sheets. The relatively stiff material, forming one of the faces of the package, is cut through in a pattern and the cut pattern thereafter is coated or covered with a sealant such as a plastic coating, wax or foil to prevent seepage. The package opens by bending or folding the container at the cut pattern since as the package is folded back, the cut stiff material ruptures the sealant at the cut and the edges of the cut open up allowing the product to flow out of the package. Such a package as described therein represents a considerable improvement over prior art packages. However, neither the sealant applied over the cut nor the relatively stiff material of the package impart barrier protection to the contents of such a package. As a result, products contained in such packages lose moisture and may become dehydrated when stored for extended periods, e.g. within six months.

The present invention provides an improvement in such and similar packages as disclosed in the Redmond patent.

The packages of the present invention have improved package strength, have moisture barrier properties and afford protection of the packaged product from contaminants through the utilization of an imperforate, uniaxially oriented polymeric plastic sheet layer which is attached over the scored, relatively stiff (rigid or semi-rigid) member. The imperforate film is unimpaired in its barrier properties and is oriented to the extent that it exhibits a differential in tear strength which makes it easily ruptured to form an opening through which product can flow upon bending the package. The protective film layer ruptures without the exertion of a tearing action or other physical weakening or exertion of pressure, the forces generated during bending of the package being sufficient to initiate the rupture of the score and of the superimposed uniaxially oriented film.

The package of the instant invention may be formed by the general method disclosed in U.S. Pat. No. 3,986,640. Briefly, the package is formed by superimposing a web or sheet of relatively flexible material over a cut through or scored web or card of rigid or semi-rigid material after which a layer of imperforate, uniaxially oriented polymeric film is superimposed over the scored rigid material. The product to be packaged is placed between the sheets and the sheets are joined to each other at their respective marginal edge portions, for example, by heat sealing. Alternatively, the package may be filled, sealed and scored and the imperforate oriented film may then be attached to the scored member, either adhesively or by heat sealing or the imperforate oriented film may be attached to the scored rigid member and shipped, together with the flexible member for filling and sealing by the product manufacturer. Wax, foil or plastic coating sealants are not necessary since the final oriented film functions to fill the cut area as well as to provide package strength, moisture barrier properties and protection from contaminants to the entire surface of this face of the package.

To remove or dispense the product, the package is bent or folded away from the scored area toward the pocket. The flexible material sides of the package at the opposite sides of the scored area are folded to contact each other. As the package is folded or bent, the scored material, as well as the imperforate oriented film superimposed thereover, is ruptured; the edges of the scored area and the imperforate film open up allowing the product to flow out. By pressing the flexible sides against each other or by folding the package upwardly in a V, the product can be squeezed out of and discharged from the package.

BRIEF DESCRIPTION OF THE DRAWINGS

FIG. 1 is a plan view of the top of a package of the instant invention and showing one embodiment thereof;

FIG. 2 is a plan view of the bottom of the package as illustrated in FIG. 1;

FIG. 3 is an enlarged sectional view of the package illustrated in FIG. 1 taken along line 3—3 thereof;

FIGS. 4 and 5 are enlarged fragmentary sectional views of the package of FIG. 1 showing the package in various positions as it is folded.

DESCRIPTION OF A PREFERRED EMBODIMENT

The drawings illustrate a dispensing package 10 including a bottom rigid or semi-rigid member 12 and a top flexible member 11 in opposed relation and sealed together at peripheral marginal portions. The relatively rigid bottom member 12 comprises a layer member 14 which is cut through or scored at 16 in a straight line or in a continuous or interrupted cut pattern extending across the layer member 14. Superimposed over said scored member 14 is an imperforate, uniaxially oriented plastic film layer 18 which may be secured to said member 14 by any convenient technique, e.g. by lamination, heat sealing or by adhesion using pressure-sensitive or other adhesive materials. In the embodiment illustrated, the oriented film is secured through an adhesive 20.

Flexible top member 11 may be comprised of one or more layers of materials which may be coated or uncoated, and may likewise be secured to bottom member 14 either by heat sealing, adhesively, etc., to form a pocket 13 for containment of the product Y. As illustrated, top member 11 is formed with a crease line 24 which is positioned relative to the position of the score line 16 in the bottom member. It will be understood that the crease line is not required for the successful operation of the invention and constitutes merely a preferred mechanism for facilitating folding or bending during opening of the package.

As best seen in FIGS. 4 and 5, the package 10 is opened by bending or folding the package about the axis of the scored area 16 toward the direction of the pocket. As the package is bent and folded, the scored area 16 is ruptured. At the same time, sufficient stress is generated on or in the oriented imperforate film 18 to cause its rupture along a selective and predetermined weakness that is inherent in the film as a result of the orientation that it has been subjected to.

The flexible top member or the material constituting the flexible face of the package may be comprised of flexible plastic sheeting, polyethylene, paper, metal foil, polyesters such as polyethylene terephthalates, cellophane, polypropylene and combinations of such materials in multi-layered laminations. Similarly, the flexible material may be coated with plastic coatings to convey specific characteristics, as desired. In an especially preferred embodiment herein, top member 11 as illustrated in the drawings in FIGS. 3 to 5, comprises a multi-layer structure of polyethylene 26 or similar heat sealable material, aluminum foil 28 and a polyethylene terephthalate polymer 30. When metal foil is employed and it is desired to adhesively secure the flexible sheet thereto, the foil is preferably coated with a heat sealable lacquer or otherwise conditioned to improve adhesion.

The bottom member or material constituting the rigid or semi-rigid face of the package can be selected from a wide variety of materials such as plastic or multi-layered laminations of such materials. Suitable materials include polystyrene, methyl methacrylate polymers of butadiene-styrene-acrylonitrile, polymers or acrylonitrile-methacrylate with butadiene-acrylonitile copolymer and similar materials which may coated or uncoated with adhesive or heat sealable plastic coating to facilitate securing the rigid material to the oriented film and to the flexible top member. The structure illustrated in the drawing in FIGS. 3 to 5 comprises acrylonitrile-methacrylate-butadiene acrylonitrile polymer (available commercially as Barex from Monsanto) as layer 14, a pressure-sensitive adhesive 20, and a uniaxially oriented high density polyethylene layer 18.

It is essential in obtaining the objective of this invention that the film 18 possess a high degree of uniaxial orientation and it is preferred that the film 18 be positioned on the scored rigid member 14 so that the axis of orientation of the film extends substantially parallel to the score 16.

The film may be transparent or opaque although transparency is preferred as it allows the consumer to see the packaged product. If desired, a line of ink may be printed on the film in the area superimposed over the scored area and printed indicia may direct the consumer to fold or bend the package upward toward the pocket to open the package.

To be satisfactory for use in the present invention, the film 18 must be capable of a high degree of orientation along a given axis. Such orientation is generally achieved in known manner by compression rolling of the film or by stretching the film linearly between nips or surfaces operating at different speeds. Polyethylene having a specific gravity of greater than about 0.94, usually referred to as high density polyethylene, is of particular utility both for its excellent performance characteristics and also from the economy standpoint. Uniaxially oriented high density polyethylene (HDPE) of between 0.5 and 2.0 mils. thickness is the preferred material for use in this invention. Of nearly comparable utility are uniaxially oriented films of homopolymeric polypropylene. Uniaxially oriented copolymers or propylene with ethylene, medium and low density polyethylene, polyvinyl chloride, polyesters such as ethylene-vinyl acetate copolymers, ethylene ethyl acrylate, etc. may also be used. In general the inherent strength of polymeric materials arises from several molecular forces. The overwhelming contribution comes from the covalent bonds along the chain axis of the molecules. Orientation along a single axis results in the predominant alignment of the chain axis of the molecules parallel to the orientation direction, thereby giving great strength in that direction.

Furthermore, the resultant lack of molecules aligned in the direction perpendicular to the direction of orientation results in weak bonds in the transverse direction. The uniaxial orientation of the molecules thus accounts for the very great differences in tear strength between the with-grain axis and the cross-grain axis of the film. It is this difference which gives rise to the selective rupturability essential to use of a given film in the present invention. High density polyethylene and other polymers which exhibit relatively high crystallinity have low amounts of amorphous or branched molecules to form cross-grain ties or entanglements. In the monoaxially oriented state these films will split linearly under application of a slight amount of pressure, the resulting slit running in the direction of orientation of the film.

The most desirable uniaxially oriented films for use in this invention will tear very easily to rupture in the with-grain direction, or parallel to the axis of orientation, whereas it is very difficult to tear the film across the grain, or perpendicular to the axis of orientation.

In order for a film to perform satisfactorily in this invention it is, of course, necessary that the tensile strength, measured in the machine, or with-grain direction, be significantly greater than in the transverse or cross-grain direction. Generally, the with-grain to cross-grain tensile strength ratio should be greater than 1.5 to 1, and preferably greater than about 4 to 1. Preferably, the film will exhibit no more than a 100% extensibility, especially in the transverse direction.

Thus, for example, the preferred high density polyethylene film exhibits a with-grain to cross-grain tensile strength ratio of between 5 to 1 and 6.5 to 1, a transverse elongation of between 20 and 50% and a machine direction elongation of between 30 and 75%. Therefore, as stress is generated to the film as the package is opened, the film will tend to break rather than to stretch, since the film is relatively inextensible. Furthermore, since the tensile strength ratio strongly favors film severance in response to forces applied in the transverse or cross-grain direction rather than in response to forces applied in the direction of orientation, or machine direction, the rupture forms and is propagated with the grain, rather than across it.

Other uniaxially oriented films which are very satisfactory for use in this invention also exhibit comparable elongation and tensile ratio characteristics. In the following Table are tabulated properties of a number of uniaxially oriented films. In each case, the films have been oriented by compression rolling in accordance with the process set forth in U.S. Pat. No. 3,504,075, the degree of orientation being substantially the maximum obtainable by the compression rolling process in each case. Other films in the Table have been included for purposes of comparison.

TABLE

| Film | Machine Direction Tensile Strength lbs./Square Inch | Moisture Vapor Transmission Rate, grams/24hrs/100 square inches |
|---|---|---|
| *High Density Polyethylene | 35,000 | 0.05–.15 (2 mils.) 0.15–.25 (1 mil.) |
| *Polyester | 27,500 | 1.7–1.8 (1 mil.) |
| *Polypropylene | 20,000 | 0.3–0.5 (1 mil.) |
| *Polystyrene | 10,000 | 7–10 (1 mil.) |
| *Low Density Polyethylene | 17,500 | 0.25–.45 (1 mil.) |
| High Density Polyethylene | 3,500 | 0.4–.70 (1 mil.) |
| Polypropylene | 7,000 | 0.6–.70 (1 mil.) |
| Low Density Polyethylene | 2,000 | 1–1.3 (1 mil.) |
| Polyvinyl Chloride | 8,000 | 6–10 (1 mil.) |
| Nylon | 13,000 | 12–14 (1 mil.) |
| Acetate | 7,500 | 15–40 (1 mil.) |

*Uniaxially Oriented Film

As may be seen from the data in Table 1, the most desirable films, such as oriented high density polyethylene, polyester, polypropylene and low density polyethylene exhibit, as a necessary combination of physical characteristics, a relatively high tensile strength in the machine direction together with high moisture barrier properties. It may also be seen that while oriented polystyrene possesses adequate tensile strength, it is notably deficient in moisture barrier properties.

The preferred high density polyethylene sheet, after subjection to the highest degree of uniaxial orientation reasonably attainable, has a tensile strength ratio (with-grain to cross-grain) of greater than 4 to 1 and generally between 5 to 1 and 6.5 to 1, a maximum with-grain elongation of from 20 to 100% and preferably from 30 to 75%, and a maximum cross-grain elongation of from 20 to 100% and preferably between 20 and 50%. Other desirable and satisfactory films show tensile and elongation values within the limits previously stated as acceptable.

The use of the imperforate oriented film in the package of the invention provides for the use of a single straight score or a cut interrupted or uninterrupted pattern without otherwise providing for sealants or other precautions against premature opening, contamination or abuse of the scored area. The oriented material is selected to have barrier properties protecting the product from loss of moisture without interfering in any way with the opening of the package and dispensing of the package contents.

The straight score line 16 described hereinabove may extend across the entire length or width of the relatively stiff member 12 or over only a portion thereof to control the amount of product dispensed, if desired. Similarly, instead of a straight score line, interrupted cut patterns of varying configuration may also be employed, the major requirement for meeting the objective of this invention being the positioning of the uniaxially oriented film 18 on rigid member 12 so that the directional strength characteristics of the film are utilized, that is, by positioning the easily rupturable film superimposed over the scored area or cut pattern with the machine direction of the film running parallel to the score line. The improved package of the invention is readily opened and the product packaged therein is easily dispensed in a single, one hand operation. Thus, as illustrated particularly in FIGS. 4 and 5, by bending the package about the axis of the score line and bringing the flexible sides of the package into contact with each other at the opposite sides of the axis, as facilitated by the crease line 24, the package is opened and the product is dispensed.

It is to be understood that the package shape may vary and that the axis of orientation of the film may be aligned as desired in relation to the geometry of the cut or scored line to achieve the desired dispensing action.

I claim:

1. A dispensing package for a flowable product comprising a flexible top member having at least one layer and secured to a rigid or semi-rigid base member at marginal edge portions to form a pocket, for containment of a flowable product, said base member comprising an outer layer having a cut score area and an imperforate, uniaxially oriented polymeric film attached to the outer surface of the second layer, the imperforate film being oriented to the extent that it exhibits a tear strength differential between the orientation direction and the direction perpendicular to the orientation direction, the oriented film being so positioned on said rigid or semi-rigid member that the orientation direction of the film extends substantially parallel to the cut score area, whereby said score area and said imperforate film rupture to open the package upon bending the base member in a direction toward the pocket.

2. A package, as defined in claim 1, in which said cut scored area is a single uninterrupted score line extending across said base member.

3. A package, as defined in claim 1, in which said cut scored area is an interrupted series of cuts forming a series of tongues extending across said base member.

4. A package, as defined in claim 1, in which said top and base members are multilayer laminates.

5. A package, as defined in claim 1, in which said imperforate oriented film is selected from the group consisting of high density polyethylene, polypropylene, low density polyethylene, and polyesters.

6. A package, as defined in claim 1, in which said flexible top member comprises materials selected from the group consisting of polyethylene, metal foil, polypropylene, polyethylene terephthalate, paper and combinations thereof.

7. A package, as defined in claim 1, in which said base member comprises materials selected from the group consisting of polystyrene, methyl methacrylate polyester of acrylonitrile butadiene-styrene terpolymer, copolymers of acylonitrile-methylacrylate and butadiene-acrylonitrile, and combinations thereof.

8. A package, as defined in claim 1, wherein said flexible top member has a crease line, positioned therein to correspond to the position of the score in said base member, said crease line functioning to facilitate bending of the flexible top during opening of the package.

9. A package, as defined in claim 1, wherein said base member is bent into a V about an axis toward the pocket so that said flexible top portion and said flowable product in said pocket are between the arms of said V as said arms are forced together thereby causing said flowable product to flow from said pocket through said package opening.

10. A dispensing package for a flowable product comprising: (1) a multilayer flexible top member comprising an outer layer of polyethylene terephthalate copolymer adhered to aluminum foil and an inner heat sealing layer of polyethylene; secured to (2) a multilayer rigid or semi-rigid base member secured to said flexible member at marginal edge portions to form a pocket for containment of a flowable product; said base member comprising an outer layer of a polymer of acrylonitrile-methylacrylate and butadiene-acrylonitrile, the outer layer having a single, straight, uninterrupted cut pattern extending across its surface, and (3) an imperforate, uniaxially oriented film of high density polyethylene attached to the outer layer of the base member; said polyethylene film being oriented to the extent that it exhibits a tear strength differential between the orientation direction and the direction perpendicular to the orientation direction, said oriented polyethylene film being so positioned on said base member that the orientation direction of the film extends substantially parallel to the cut pattern, whereby said scored area and said polyethylene film rupture to open the package upon bending the base member in a direction toward the pocket, said oriented film providing moisture barrier properties to said rigid base member.

11. A package as defined in claim 10 wherein the marginal edge portions of said top member and said base member are heat sealed one to the other to form a pocket for the flowable product.

12. In a dispensing package for a flowable substance having a relatively rigid or semi-rigid flat side and a flexible arched side secured to one side of said flat side and forming between said flat side and said arched side a pocket for containing a flowable product and wherein the flat side has a cut score area forming an opening when the flat side is bent in a direction toward said pocket, the improvement which comprises an imperforate, uniaxially oriented polymeric film attached to the outer surface of the scored flat side, said film being oriented to the extent that it exhibits a tear strength differential between the orientation direction and the direction perpendicular to the orientation direction, said film being so positioned on said scored flat side that the orientation direction of the film extends substantially parallel to the cut score area; said film providing moisture barrier properties and improved strength to said package and rupturing to provide a package opening upon bending the base member in a direction toward the pocket.

13. The improvement of claim 12 wherein said imperforate, oriented film is selected from the group consisting of high density polyethylene, polypropylene, polyesters and low density polyethylene.

14. The improvement of claim 12 wherein said uniaxially oriented imperforate film is high density polyethylene.

* * * * *